April 22, 1969     N. J. RYSKAMP     3,439,927
SUSPENSION MECHANISM FOR VEHICLE WHEELS
Filed March 30, 1967

Inventor
Neil J. Ryskamp
By Charles L. Schwab
Attorney

Inventor
Neil J. Ryskamp
By Charles L. Schwab
Attorney

United States Patent Office 3,439,927
Patented Apr. 22, 1969

3,439,927
SUSPENSION MECHANISM FOR VEHICLE WHEELS
Neil J. Ryskamp, Markham, Ill., assignor to Allis-Chalmers Manufacturing Company, Milwaukee, Wis.
Filed Mar. 30, 1967, Ser. No. 627,121
Int. Cl. B60g 11/28
U.S. Cl. 280—6                                      8 Claims

ABSTRACT OF THE DISCLOSURE

Illustrated in the drawings and described in the following description is a suspension mechanism for a pair of steerable vehicle wheels. This suspension mechanism is particularly suited for use in a lift truck wherein space for suspension mechanism is limited because of an engine mounted above and between the rear steerable wheels. My suspension mechanism utilizes a pair of lower toggles and a pair of upper toggles for mounting upstanding wheel supports to which the wheel axles are pivoted for steering movement. A pair of hydraulic jacks are connected to the suspension mechanism and have corresponding pressure chambers interconnected to serve as equalizing means.

Description

Conventionally, the rear axle for a lift truck is pivoted to the vehicle chassis on a longitudinal pivot axis in the central plane of the vehicle. When this type of axle oscillates about its longitudinal pivot axis, the wheels move in an arc about such axis. It has been demonstrated that tire wear is greater when this conventional suspension is used as compared with my suspension mechanism wherein the wheels move substantially in an up and down path rather than about a central pivot. My suspension linkage for a pair of wheels not only guides them in a substantially up and down movement during oscillation, but provides a hydraulic equalizing suspension which affords easier riding through shock absorption. Further, my design facilitates short turn radius steering of the suspended wheels. I provide a pair of hydraulic jacks for supporting the suspension linkage for the wheels wherein a passage interconnects pressure chambers to selectively permit oscillation or toggle movement therebetween. If desired a lock-out or restrictor can be used in this interconnecting passage to obtain the desired speed of toggle action or obtain a rigid wheel suspension for particular circumstances.

It is an object of this invention to provide an improved suspension system for a pair of steerable wheels wherein the wheels move in a substantially up and down path when traveling over uneven terrain or flooring.

It is a further object of this invention to provide a suspension for a pair of steerable wheels utilizing a pair of toggle members for each wheel and hydraulic actuators which are interconnected by a cross over passage to permit the exchange of fluid which in turn allows up and down equalizing movement of the wheels.

It is a further object of this invention to provide a wheel suspension which provides superior tire life and improved vehicle ride characteristics.

It is a further object of this invention to provide an improved wheel suspension which allows short turn radius steering, is economical to the manufacturer and maintain and has long trouble free service life.

These and other advantages of this invention will be apparent when the following description is read in conjunction with the drawings in which.

Figure 1:
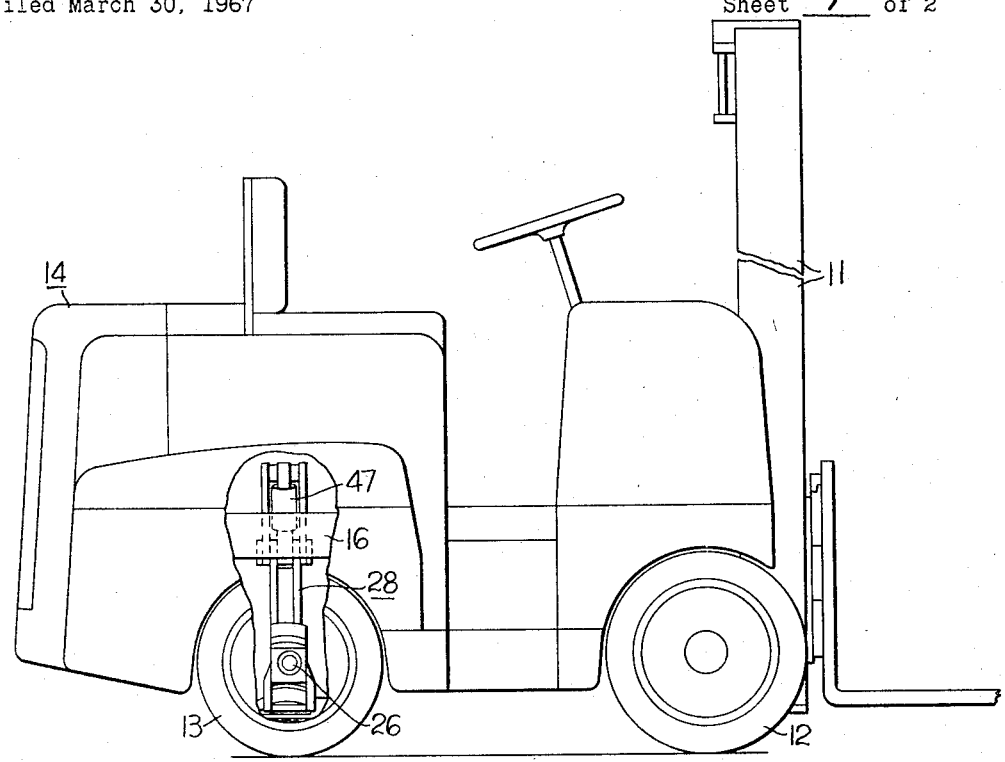
FIG. 1 is a side view of a lift truck incorporating the present invention.

Referring to FIG. 1, the lift truck includes a pair of front drive wheels 12 which are connected to the engine through a gear train, not shown. The load carrying mast 11 is secured in a conventional manner to the front end of the vehicle and an appropriate counterweight 14 is carried at the rear of the vehicle.

Figure 3:
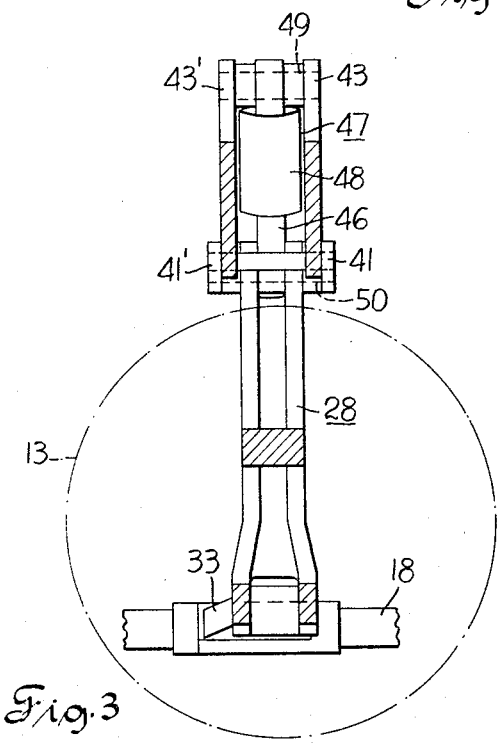
FIG. 3 is a section view taken along the line III—III in FIG. 2.
Figure 4:
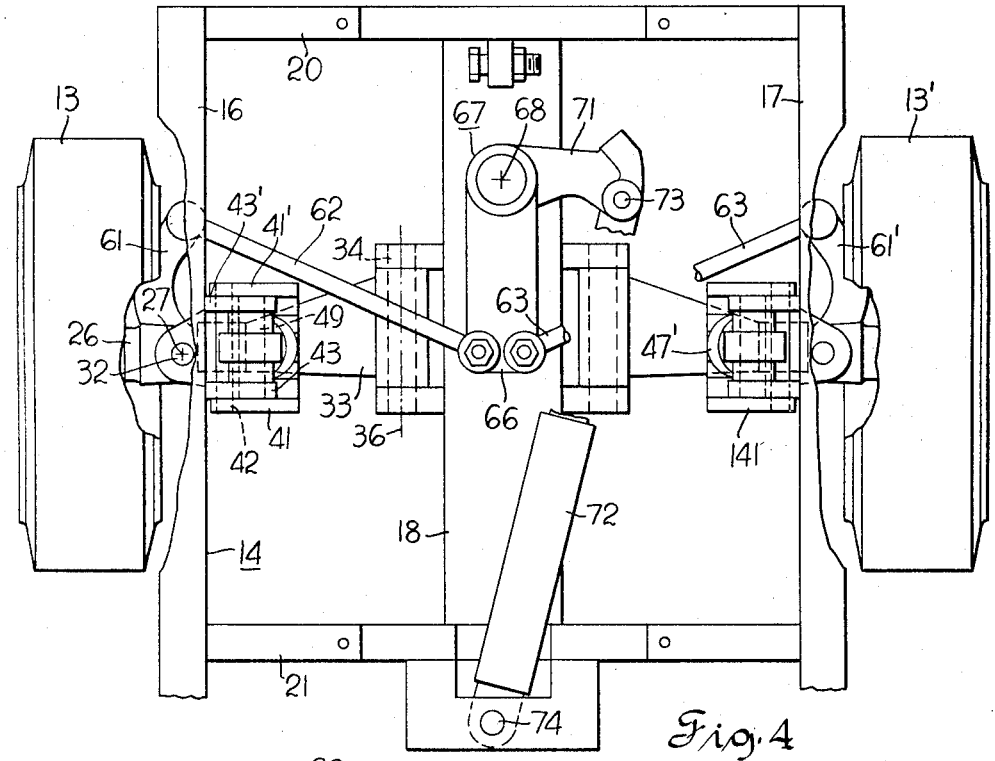
FIG. 4 is a top view of the suspension system shown in FIG. 2.
Figure 2:
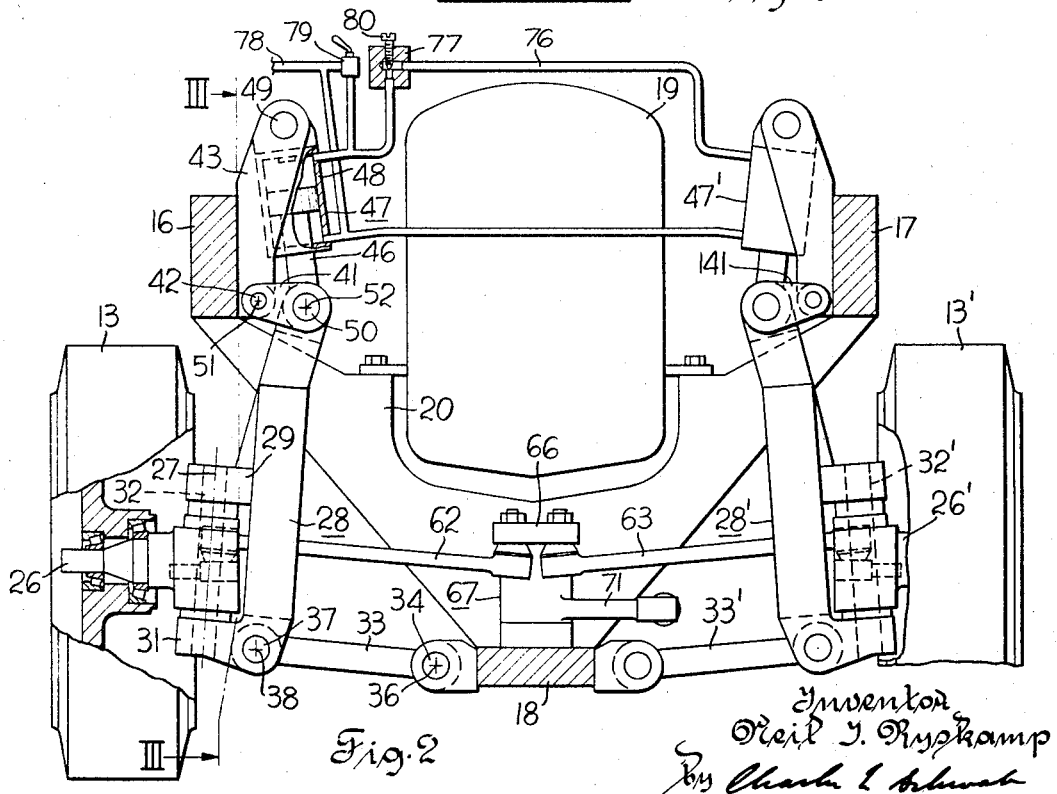
FIG. 2 is a vertical section view of the vehicle shown in FIG. 1 with certain parts omitted to more clearly show the wheel suspension of this invention.

As shown in FIGS. 2 and 3, the rear wheels 13, 13′ are steerable and mounted by my novel suspension mechanism to permit up and down movement when traveling over uneven floors or ground. My suspension linkages are interposed between the wheels 13, 13′ and the vehicle frame 14 which includes a pair of longitudinal components 16, 17, a longitudinal part 18 positioned below the engine 19 and interconnecting lateral brace members 20, 21. The braces 20, 21 support the vehicle engine 19 in conventional manner.

Wheel 13 is mounted on an axle 26 which in turn is pivotally supported on a substantially vertical axis 27 by a vertically disposed support 28. The wheel support 28 has a pair of outwardly extending brackets 29, 31 to which the axle 26 is secured by a king pin 32. A lower toggle member 33 has its laterally inner end pivotally connected to longitudinal part 18 by a pin 34 for pivotal movement about an axis 36. The lateral outer end of laterally extending lower toggle link 33 is pivotally connected to the lower end of the wheel support 28 by a pin 37 on a longitudinal pivot axis 38 which is parallel to axis 36. A laterally extending upper toggle link 41 has its laterally outer end connected to longitudinal component 16 of the vehicle frame 14 by a pivot pin 42 supported in brackets 43, 43′ welded on frame component 16. Similarly a toggle link 41′ is pivotally connected to the frame 14 by pin 42.

As shown in FIG. 3, the laterally inner end of the links 41, 41′ constituting the upper toggle, are pivotally connected to the upper end of wheel support member 28 and also to the piston rod 46 of a hydraulic jack 47 by a pivot pin 50. The hydraulic jack 47 includes a cylinder 48 which is pivotally connected by a pin 49 to the upper end of brackets 43, 43′. The upper toggle axes 51, 52 of the upper toggle pivot connections are parallel to the axes 36, 38 of the lower toggle pivot connections thus providing a quadralateral linkage suspension for the wheel 13.

Wheel 13′ is mounted similar to wheel 13 by a lower toggle member 33′ and upper toggle member 141 through pivot connections with a wheel support member 28′. Axle 26′ is pivotally connected to wheel support 28′ by an upstanding king pin 32′.

The axles 26, 26′ supporting the steer wheels 13, 13′ have rearwardly extending arms 61, 61′ to which steering rods 62, 63, respectively, are pivotally connected. The laterally inner ends of the rods 62, 63 are pivotally connected at laterally spaced points to a longitudinally extending arm 66 of a bell crank 67. The bell crank 67 is pivotally connected to frame part 18 for pivotal movement about a vertical axis 68. The bell crank 67 includes an arm 71 to which a longitudinally extending steering jack 72 is pivotally connected by pivot pin 73. The rear end of the steering cylinder 72 is pivotally connected to the vehicle frame by the pivot pin 74.

The pressure chambers of the support jacks 47, 47′ are interconnected by a fluid passage in the form of a conduit 76 which may be provided with a variable restrictor 77. The variable restrictor can be used as a variable orifice or a shut-off valve. Make-up fluid to compensate for leakage can be supplied through a passage 78 connected to a suitable source. A shut-off valve 79 which is normally closed is provided between a make-up fluid passage 78 and the cross-passage 76.

During travel of the truck over uneven ground, fluid will flow back and forth in passage 76 to permit one of the wheels 13, 13' to move upwardly as the other wheel moves downwardly. The illustrated linkage guides the wheels in a substantially up and down path, rather than about a central longitudinal pivot. The speed with which such toggle movement of the wheels occurs can be regulated by turning the shut-off screw of valve 77 to vary the size of the orifice. In some instances it may be desirable to prevent vertical movement of the wheels 13, 13'. This can be accomplished by turning screw valve 80 to a completely closed position.

From the foregoing description it is apparent that I have provided a novel wheel suspension for a lift truck which affords a virtually straight up and down toggle motion of the steer wheels 13, 13'. Experimental use has shown that there is less scuffing of the tires during turning with my wheel suspension as compared with the conventional wheel suspension employing an axle pivoted about a central longitudinal pivot. Thus my suspension provides superior tire life. It will also be noted that the suspension linkage and supporting jacks 47, 47' require a minimum of lateral space with the upper toggles 41, 141 and jacks 47, 47' conveniently disposed between the frame members 16, 17 and the engine 19. My suspension effects superior riding comfort for the operator, without mechanical springs, through the restricted flow between jacks 47, 47'. The speed of toggle movement of wheels 13, 13' can be regulated by adjustment of the valve member 80 of variable restrictor 77. In instances where increased stability is desired, the restrictor 77 may be completely closed to lock the wheels 13, 13' against vertical movement relative to the vehicle frame 14. My suspension permits a very short turning radius; in fact, the vehicle can be turned about one of its drive wheels 12.

The embodiments of the invention in which an exclusive property or privilege is claimed are defined as follows:

1. In a vehicle having a frame including a pair of longitudinally extending components and an engine supported on said frame between said components, means for suspending a pair of laterally spaced steerable wheels from said frame comprising:
   a pair of axles rotatably mounting said wheels, respectively,
   a pair of upright wheel support members pivotally supporting said axles, respectively, for steering movement relative to said support members,
   a pair of laterally extending lower toggle members pivotally connected at their laterally outer ends to said wheel support members, respectively, and pivotally connected at their laterally inner ends to said frame,
   a pair of laterally extending upper toggle members pivotally connected at their laterally outer ends to said longitudinally extending components, respectively, and pivotally connected at their laterally inner ends to said wheel support members, respectively, and
   support means for controlling the vertical position of said wheel support members relative to said frame including a pair of hydraulic jacks interposed, respectively, between one of said pairs of members and said longitudinally extending components, said jacks being disposed on laterally inner sides of said components and on opposite sides of said engine.

2. The structure set forth in claim 1 wherein said jacks are pivotally connected, respectively, to one of said pairs of upper toggle and wheel support members.

3. The structure set forth in claim 2 wherein said jacks are pivotally connected to the laterally inner ends respectively, of said pair of upper toggle members.

4. The structure set forth in claim 2 wherein said jacks are pivotally connected to the upper ends respectively, of said pair of wheel support members.

5. The structure set forth in claim 1 wherein said pair of jacks have corresponding ends pivotally connected to the upper ends, respectively, of said wheel support members and to the laterally inner ends, respectively, of said upper toggle members on the axes, respectively, of the pivot connections between said upper toggle members and said wheel support members.

6. The structure set forth in claim 1 wherein said jacks are vertically upstanding and said means are disposed laterally between the steerable wheels.

7. The structure set forth in claim 1 wherein said frame includes a longitudinally extending part disposed below said engine to which said lower toggle members are pivotally connected.

8. The structure set forth in claim 7 and further comprising a fluid passage placing corresponding pressure chambers of said jacks in fluid communication.

References Cited

UNITED STATES PATENTS 3,191,954   6/1965   Schuetz.
3,207,249   9/1965   Singer _____ 280—6.11 X
2,849,225   8/1958   Lucien.

PHILIP GOODMAN, *Primary Examiner.*

U.S. Cl. X.R.

267—11; 180—41; 280—43.23